Patented Mar. 28, 1950

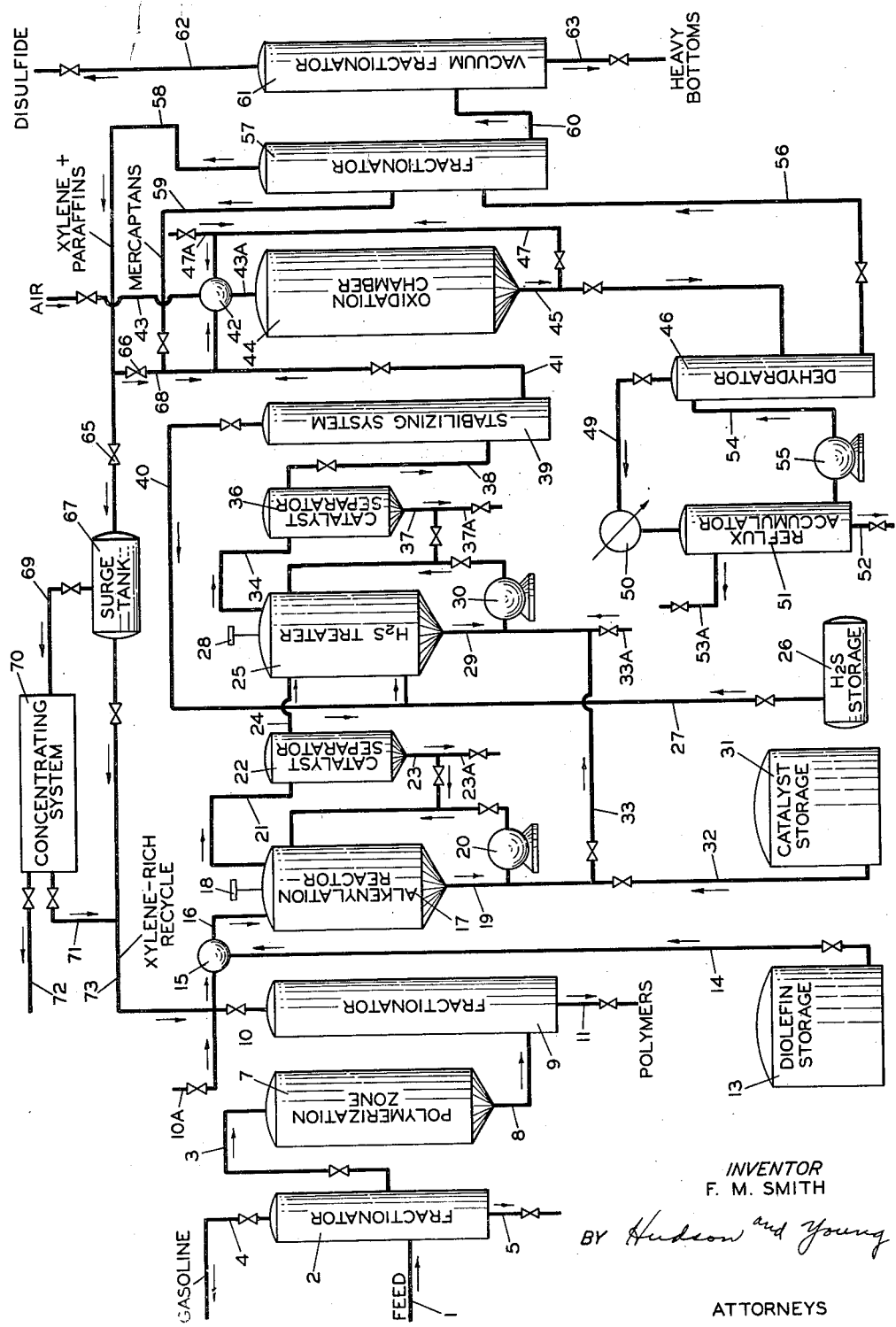

2,501,792

UNITED STATES PATENT OFFICE 2,501,792

SYNTHESIS OF DISULFIDES

Fredrick M. Smith, Bartlesville, Okla., assignor to Phillips Petroleum Company, a corporation of Delaware Application September 22, 1947, Serial No. 775,470

2 Claims. (Cl. 260—608)

This invention relates to new organic disulfides and to a process for their production. In one embodiment it relates to novel aralkyl disulfides and to a continuous catalytic process for their production. In one specific embodiment this invention relates to a process for the preparation of bis (xylyl alkyl) disulfides.

High molecular weight organic disulfides have found numerous applications in the chemical industries. Among these are their employment as additives to prevent the deterioration of lubricating oils, as plasticizers for elastomers, as chemical intermediates and the like. In general, the products so employed are mainly alkyl disulfides produced from aliphatic mercaptans. While aromatic substituted disulfides have numerous potential advantages for such uses, comparatively little attention has been given to their production.

I have now prepared a group of new aromatic substituted organic disulfides comprising those of the following general formula:

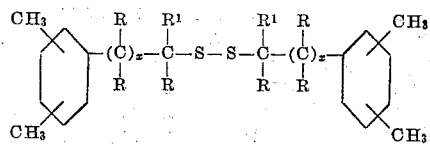

wherein each X is 1 or 2, each $R^1$ is an alkyl group containing not more than three and preferably not more than two carbon atoms, and each R is methyl, halide, or hydrogen and the total number of carbon atoms in $-(CRR)_x CRR^1-S-$ is at least four and not more than six. I have also discovered a novel continuous process for the production of my new disulfides from a xylene concentrate obtained from a naphtha of high aromatic content. As a specific example of the type of new organic disulfide which I have prepared the following formula is given:

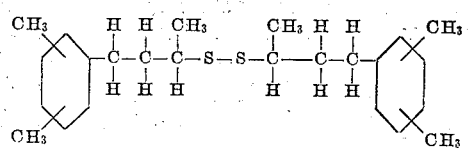

One object of this invention is to manufacture new organic disulfide material.

Another object is to provide a process for the manufacture of novel aromatic disulfides.

Still another object is to provide bis (aryl alkyl) disulfides.

Still another object is to provide a method for the manufacture of bis (xylyl alkyl) disulfides.

Still a further object is to provide a continuous process for the manufacture of bis (xylyl alkyl) disulfides.

Still a further object is to provide a process for the production of dixylyl dibutyl disulfide.

Other objects will be obvious to one skilled in the art from the accompanying discussion and disclosure.

The process of my invention comprises the series of integrated steps; (a) preparation of a xylene concentrate from a naphtha of high aromatic content and removing olefins therefrom by catalytic polymerization; (b) commingling a molar excess of the said xylene concentrate with a conjugated diolefin and contacting the mixture with an alkenylation catalyst, usually a liquid complex or addition product of boron fluoride, under conditions for substantially complete conversion of the diolefin to alkenyl xylene; (c) passing the effluent to a second reactor into which a stream of hydrogen sulfide is introduced and where in the presence of a suitable catalyst, preferably the same as that employed in the alkenylation step, the alkenyl xylene is substantially completely converted to xylyl substituted secondary alkyl mercaptans, the reaction being effected in the unconverted residue of the xylene concentrate as diluent; (d) discharging the mixture through a stabilizing unit for removal of unconverted hydrogen sulfide and from thence to an oxidation step where the said xylyl substituted secondary alkyl mercaptans are converted to the corresponding disulfides over a catalyst such as cupric chloride, the reaction again being effected in the diluent provided by the unreacted xylene concentrate from the alkenylation step; (e) fractionating the oxidation effluent to separate unreacted mercaptan and xylene concentrate which are recycled in such a manner that a portion of the xylene concentrate substantially equivalent in xylene content to the per pass conversion to disulfide is returned to the alkenylation zone while the unconverted mercaptan and remaining diluent are recycled through the oxidation step; (f) vacuum distillation of the higher boiling residue to provide a purified disulfide product.

In the practice of my invention I have preferred to employ liquid type catalysts comprising complexes or addition compounds of boron fluoride with water or phosphoric acid for both the alkenylation and hydrogen sulfide treatment steps. In this manner a single catalyst composition is used for two successive reactions to provide numerous advantages from the viewpoint of simplicity in operation. The employment of other catalysts in these steps, such as hydrogen fluoride, either aqueous or anhydrous, for the alkenylation step and silica-alumina for the hydrogen sulfide treatment, is applicable to my process and is within the scope of my invention.

For the oxidation step a solid type catalyst comprising cupric chloride adsorbed in aqueous phase on an inert support such as clay, fuller's earth, or other similar material is generally preferable, although in some instances an aqueous solution of cupric chloride or other oxidation catalyst may be employed if desired. When operating with my preferred solid type cupric chloride catalysts, a stream of air or other oxygen containing gas is introduced into the feed stream to the oxidation unit for the purpose of regenerating the catalyst continuously as the reaction proceeds. The oxidation of the mercaptan to the corresponding disulfide and simultaneous regeneration of the catalyst takes place according to the following equations:

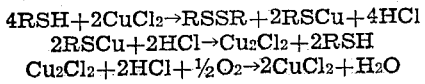

In effect, these reactions may be summarized by the single equation:

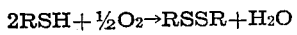

Water from the reaction and/or from the catalyst mass is carried away dissolved in the effluent stream, and since the active cupric chloride in the catalyst is absorbed in aqueous phase on the supporting material, it is generally desirable to recycle a small portion of the said moist effluent into the feed to the oxidation step to prevent drying out of the catalyst bed or water may be added continuously or intermittently to the system as desired.

The xylene concentrate employed as feed stock to my process is obtained by fractionating a naphtha of high aromatic content to produce a cut boiling in the range of about 260 to 310° F., comprising a high percentage of xylenes in admixture with paraffinic and olefinic constituents. A convenient source of a suitable high aromatic material for use in the preparation of such a fraction may be found in the products from high temperature thermal treatment of naphthas and light hydrocarbons, for example, from a gas reversion process which is described on page 23 of the book entitled "Summary of Technical and Patent Assets," 1946 edition, published by Phillips Petroleum Company. Also, a suitable stock may be obtained from products of catalytic cracking processes, for example the cycloversion process which is described by W. A. Schulze, et al. in the Oil and Gas Journal, April 13, 1944. In order to prevent objectionable side reactions in the process and also to further concentrate xylenes in the feed stock, olefinic constituents are removed by polymerization over a suitable polymerization catalyst such as silica-alumina.

The employment of a xylene concentrate as a feed stock to my process has several important advantages. Not only is the necessary aromatic substance, namely xylene, provided as a principal reactant in the process but an inert portion in the same boiling range is also furnished which, together with unreacted xylenes, acts as a diluent in which the reactions are effected. Furthermore, the material is readily available from abundant sources at low cost. Though xylene concentrates, as described, are preferable for my process, other aromatic feed stocks may be used in my process and may be obtained from any suitable source.

In the explanation of the accompanying drawing which illustrates diagrammatically one form of apparatus in which the objects of the invention can be accomplished, a particular embodiment of the process has been chosen in which butadiene is employed as the alkenylating agent. Such use of a particular compound is in the interest of simplicity in the explanation and does not limit the scope of the invention to the use of a particular conjugated diolefin.

Now, referring to the drawing, a naphtha of high aromatic content, say from a gas reversion process, is introduced through line 1 to fractionator 2 where a cut boiling between 260 and 310° F., comprising principally xylene in admixture with lesser amounts of olefinic and paraffinic constituents is separated and discharged through line 3. Light gasoline is removed through line 4 for storage or utilization elsewhere and higher boiling bottoms are discharged via line 5. The xylene rich fraction from line 3 is introduced into the polymerization zone 7 where olefinic constituents are polymerized over a suitable polymerization catalyst, such as a solid type silica-alumina catalyst. Effluent from the polymerization zone is discharged via line 8 to fractionator 9, where the olefin free xylene concentrate is removed overhead through line 10 and high boiling polymers are discharged via line 11. Xylene concentrate or other feed stock may be added to the system through line 10A as desired.

Butadiene from storage 13 is drawn through line 14 and admixed with the xylene concentrate in a centrifugal pump 15, or by any other suitable means, in a manner such that the ratio of xylenes in the said concentrate shall be in substantial molar excess, generally in a ratio between about two to one and about ten to one. In the practice of my invention I have found an aromatic-diolefin mol ratio between 4 and 6 to 1 particularly advantageous. The mixture is then transferred via line 16 to the alkenylation reactor 17 where it is contacted with a liquid type catalyst, preferably a composition or addition product of boron fluoride with water or phosphoric acid (85 per cent) under conditions for substantially complete reaction of the butadiene with xylene to produce butenyl xylene. In order to prevent separation of the high density liquid catalyst mechanical agitation of the system is effected, say by a stirrer as indicated at 18, or by any other suitable means. Continuous circulation of catalyst rich material from the bottom of the reactor via line 19 containing pump 20 for reintroduction near the top of the reaction zone also provides more satisfactory distribution of the catalyst through the reaction mixture.

The effluent from the alkenylation reactor comprising butenyl xylene dissolved in a mixture of unreacted xylene and paraffinic hydrocarbons together with a minor amount of catalyst composition is conveyed through line 21 to the catalyst separator 22 where it is separated into a catalyst phase and a hydrocarbon phase by gravity. At least a portion of the heavy catalyst phase which forms in the separator is restored to the circulating catalyst stream in line 19 via line 23 and the catalyst phase not recycled is removed from the system through line 23A for use elsewhere as desired or it may be sent to a catalyst regenerating system, not shown, where the catalyst is regenerated and returned to the system for further use in the process. The light hydrocarbon phase passes through line 24 to the hydrogen sulfide treater 25. Here the butenyl xylene solution is admixed with a molar excess of hydrogen sulfide introduced from storage 26 by way of line 27, in a ratio of between one and six parts hydrogen sulfide to one part butenyl xylene, and contacted with a suitable catalyst, preferably of the same composition as that employed in the alkenylation step, under conditions for substantially complete condensation of the butenyl xylene with hydrogen sulfide. As in the alkenylation step provision is made for efficient contact with the catalyst by agitation with a mechanical stirrer 28 or other suitable means and by recirculating of catalyst rich material from the bottom of the reactor via line 29 containing pump 30. Catalyst make-up for both the alkenylation and hydrogen sulfide treatment steps is provided from storage 31 via lines 32 and 33. Catalyst may be added to H2S treating system through line 33A.

The effluent from reactor 25, comprising xylyl substituted secondary butyl mercaptan dissolved in a mixture of unreacted xylene and paraffinic hydrocarbons provided from the alkenylation step together with unreacted hydrogen sulfide and a minor proportion of catalyst composition, is discharged via line 34 to the catalyst separator 36 where it separates into a catalyst phase and a hydrocarbon phase by gravity. At least a portion of the heavier catalyst phase is returned to the circulating catalyst stream in line 29 through line 37 as desired, and the rest of the catalyst phase is withdrawn from the system through line 37A for further handling, and the hydrocarbon phase discharged via line 38 to stabilizing system 39 where unreacted hydrogen sulfide is removed overhead for recycling via line 40.

The xylyl substituted secondary butyl mercaptan solution is passed through line 41 to the mixing chamber 42 comprising a centrifugal pump or other suitable device for commingling the hydrocarbon-mercaptan mixture with an oxygen containing gas such as air, which is introduced through line 43. The mixture is then passed through line 43A to the oxidation chamber 44 where it is contacted with an oxidation catalyst preferably of the solid bed type comprising cupric chloride adsorbed in aqueous phase on an inert material such as fuller's earth, clay, etc., under conditions for oxidation of a maximum proportion of the xylyl substituted secondary butyl mercaptan to the corresponding disulfide. The unreacted xylene and paraffinic hydrocarbon materials provided from the alkenylation step are present in sufficient quantity to retain in solution all disulfide produced and also to absorb the water produced in the oxidation-catalyst regeneration processes. This effluent solution is discharged via line 45 to the dehydrator 46. In order to maintain an optimum moisture content in the catalyst bed, it may be desirable to recycle a small amount of the water-containing effluent back to the mixing chamber 42 via line 47 or additional moisture, as needed, may be introduced through line 47A to mixer 42.

In dehydrator 46 the solution is maintained at a reflux temperature, the overhead vapors being discharged via line 49 containing condenser 50, and the condensate collected in a separating type reflux accumulator 51, from which the heavier water layer is removed through line 52 while the hydrocarbon layer is returned to column 46 via line 54 containing pump 55. Air is vented from the system through line 53—A. The dehydrated mixture is passed through line 56 to fractionator 57 where the unreacted xylene and inert paraffinic hydrocarbons boiling in the same range, which served as diluent for the reactions of the process, are removed overhead in line 58 while unreacted xylyl substituted secondary butyl mercaptans pass out as a side stream through line 59 for recycling to the oxidation step. High boiling disulfides are passed through line 60 to vacuum fractionator 61, where the purified disulfide is removed via line 62 and heavy bottoms discharged through line 63.

The xylene-inert hydrocarbon stream in line 58 is divided by adjustment of valves 65 and 66 in such a manner that a portion containing xylene in substantially equivalent amount to the per-pass disulfide production passes into surge tank 67, while the remainder is discharged through line 68 for addition to the mercaptan recycle stream in line 59, where it serves as a solvent and diluent. From surge tank 67 a minor proportion of the xylene-paraffin mixture is removed through line 69 to the concentrating system 70 where xylene is removed by any suitable means, such as solvent extraction, azeotropic distillation, and the like and returned via line 71 to recycle line 73 where it is commingled with the xylene-containing stream for recycling to the alkenylation step while the inert material removed in the said concentration unit is discharged via line 72 for storage or utilization elsewhere, say as a solvent, for motor fuel, and the like. The operation of concentration system 70 should be at a rate such that the xylene concentration of the recycle stream in line 73 is maintained at substantially the same level as in the original feed stock admitted through lines 10 and 10A.

In the above discussed drawing references to certain equipment, such as pumps, gauges, and the like, which obviously would be necessary to actually operate the process, have been intentionally omitted. Only sufficient equipment has been shown to illustrate the process and it is intended that no undue limitation be read into this invention by reference to the drawing and discussion thereof.

The silica-alumina catalyst employed for the polymerization of olefins from the feed stock comprises a hydrous silica gel activated with a suitable aluminum salt prepared according to the method disclosed in U. S. Patent 2,419,599, dated April 29, 1947, to W. A. Schulze. Other polymerization catalysts, for example, sulfuric and phosphoric acids may be used in my process. When operating with the preferred type catalyst the temperature in the polymerization zone is maintained in a range between about 200 and about 600° F. and is increased in small increments as the activity of the catalyst is decreased, say about 25° F. in each step, whereby maximum activity of the catalyst may be maintained throughout its life. The pressure will preferably be in a range between about 400 and about 1200 pounds per square inch gauge. Flow rate will be approximately two liquid volumes of naphtha per volume of catalyst per hour.

The catalyst I prefer to employ in the alkenylation steps comprises a liquid composition or addition product prepared by saturating water or 85 per cent phosphoric acid with boron trifluoride, although in some instances other catalysts, for example, anhydrous or concentrated aqueous hydrogen fluoride and sulfuric acid or other catalysts may be employed. When operating with these preferred catalysts, temperatures will be maintained in a range between about 70 and about 150° F., with optimum conversion in a somewhat narrower range, say about 80 to about 120° F. Pressures will be sufficient to insure liquid phase operation and to avoid vaporization of the catalyst, usually between atmospheric and about 100 pounds per square inch gauge. The flow rate should be adjusted in such a manner as to provide a contact time of from about five to about 30 minutes. The quantity of catalyst employed should be at least five per cent by volume of the hydrocarbon charge, and should in no case exceed an amount which will insure a continuous hydrocarbon phase. The mol ratio of aromatic to diolefin in the feed should be in the range between about 2 to 1 and about 10 to 1 and preferably in the range of about 4 to 1 to about 6 to 1.

In the hydrogen sulfide treatment I also prefer to employ boron fluoride compositions such as are recommended for the alkenylation step although the condensation can be effected over silica-alumina prepared in the same manner as that used in the olefin polymerization step. When operating with my preferred boron fluoride-water or boron fluoride-phosphoric acid catalysts, temperatures will be in the range between about 32 and about 150° F., preferably about 80 to 110° F., with pressures sufficient for liquid phase operation, generally in the range 100 to 1000 pounds per square inch gauge. The flow rate through the reactor will be between about 0.5 and five liquid volumes per volume catalyst per hour based on alkenyl xylenes in the stream from the alkenylation zone. The quantity of catalyst employed should be at least five per cent by volume based on the quantity of hydrocarbon present in the reactor at any given time, and should in no case exceed an amount which will insure a continuous hydrocarbon phase.

With the fixed bed cupric chloride activated catalysts which I prefer to employ in the oxidation step, temperature in the reactor will generally be in a range between about 80 and 120° F., although in some instances operations may be conducted either above or below this range. While pressures maintained in the oxidation zone may vary over a very broad range, say from below 25 to above 500 pounds per square inch gauge, I have found that very advantageous results are obtained with pressures between 75 and 125 pounds per square inch gauge, said pressure being maintained by the air fed into the system for regeneration of the catalyst.

The conjugated diolefin employed in the alkenylation step may be 1,3-butadiene, 1,3-pentadiene, 1,3-hexadiene, isoprene, chloroprene and the like. The quantity of the said conjugated diolefin will always be so adjusted that substantially complete conversion is effected, thus avoiding undesirable side reactions in the hydrogen sulfide treatment.

*Example*

A concentrate containing 34 per cent xylene was prepared by fractionating a polyform naphtha to provide a cut boiling between 265 and 295° F. and polymerizing the olefins therefrom over a silica-alumina catalyst. A 500 ml. portion of this concentrate was thoroughly admixed with 100 ml. of a boron fluoride catalyst prepared by saturating water with the gaseous BF₃. Gaseous butadiene was passed into this mixture at a rate of five liters per hour until 49 grams had been charged, pressure during the addition being atmospheric with temperature between 75 and 85° F. Thorough mixture of the reactant and catalyst was maintained by agitation in a motor driven rocker.

After completion of the reaction with butadiene the pressure was elevated to 500 pounds per square inch gauge by the injection of liquefied hydrogen sulfide. The temperature was maintained at 90 to 100° F. and the agitation continued while approximately 90 grams of hydrogen sulfide was added. The effluent was then removed and freed from unreacted hydrogen sulfide by caustic wash after which it was shaken with dilute acid, washed and dried. The reaction mixture was then passed through a solid catalyst bed prepared by impregnating fuller's earth with concentrated solutions of cupric sulfate and sodium chloride, the temperature being maintained at approximately 100° F. during the treatment. Lower boiling constituents were flashed off and the product distilled under reduced pressure to yield xylyl substituted secondary butyl disulfide in a yield of 23 per cent of theoretical.

It is to be understood that this invention should not be unnecessarily limited to the above discussion and description and that modifications and variations may be made without departing substantially from the invention or from the scope of the claims.

I claim:

1. The compound of the formula

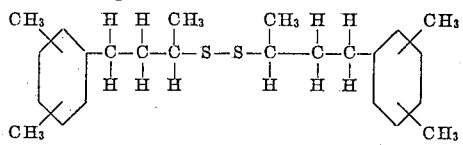

2. The compound of the formula

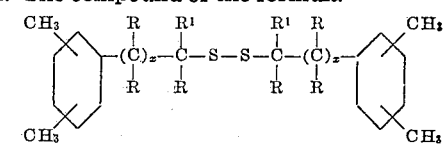

wherein each X is an integer selected from the group consisting of 1 and 2, each $R^1$ is an alkyl group containing not more than three carbon atoms, and each R is of the group consisting of methyl and hydrogen, and wherein the total number of carbon atoms in $—(CRR)_xCRR^1—S—$ is at least four and not more than six.

FREDRICK M. SMITH.

REFERENCES CITED

The following references are of record in the file of this patent:

UNITED STATES PATENTS

| Number | Name | Date |
|---|---|---|
| 2,185,008 | Wojcik | Dec. 26, 1939 |
| 2,211,990 | Shoemaker et al. | Aug. 20, 1940 |
| 2,402,685 | Signaigo | June 25, 1946 |
| 2,415,851 | Schulze | Feb. 18, 1947 |
| 2,415,852 | Schulze | Feb. 18, 1947 |
| 2,430,661 | Axe | Nov. 11, 1947 |